United States Patent [19]
Whitfill et al.

[11] Patent Number: 4,957,174
[45] Date of Patent: Sep. 18, 1990

[54] METHOD OF CONTROLLING LOST CIRCULATION IN WELL DRILLING

[75] Inventors: Donald L. Whitfill, Ponca City, Okla.; Edwin Kubena, Jr., Richmond, Tex.; Terry S. Cantu, Ponca City, Okla.; Matthew C. Sooter, Katy, Tex.

[73] Assignee: Conoco Inc., Ponca City, Okla.

[21] Appl. No.: 374,399

[22] Filed: Jun. 29, 1989

[51] Int. Cl.$^5$ .......................... C09K 7/00; C09K 7/02; E21B 33/138

[52] U.S. Cl. ..................................... 175/72; 166/294; 252/8.512

[58] Field of Search .................. 175/72; 166/292, 294, 166/295; 252/8.512, 8.516; 523/130

[56] References Cited

U.S. PATENT DOCUMENTS

| | | | |
|---|---|---|---|
| 2,241,255 | 5/1941 | Garrison | 175/72 X |
| 2,573,690 | 11/1951 | Cardwell et al. | |
| 2,650,195 | 8/1953 | Cardwell et al. | |
| 2,773,670 | 12/1956 | Miller | 175/72 |
| 2,811,488 | 10/1957 | Nestle et al. | 252/8.512 |
| 2,812,161 | 11/1957 | Mayhew | |
| 2,854,214 | 9/1958 | McArthur et al. | 252/8.512 X |
| 2,912,380 | 11/1959 | Groves | 252/8.512 |
| 3,053,764 | 9/1962 | Hummel | 252/8.512 |
| 3,375,888 | 4/1968 | Lummus et al. | 166/294 |
| 3,788,406 | 1/1974 | Messenger | 175/72 |
| 4,269,575 | 12/1986 | Weibel | 175/65 X |

OTHER PUBLICATIONS

*Modern Petroleum Technology*, "Cracking and Reforming" Knight, W. N. N. et al., John Wiley & Sons, 4th Edition 1973, pp. 283–288, copy in 3-4E06.
*Oil Well Cementing Practice in the United States*, A.P.I. New York, 1959, p.76, copy in 175-72.

Primary Examiner—George A. Suchfield
Attorney, Agent, or Firm—Richard W. Collins

[57] ABSTRACT

Loss of drilling fluid into a subterranean formation penetrated in the drilling of a well is controlled by addition to the drilling fluid of a lost circulation material comprising petroleum coke.

8 Claims, No Drawings

METHOD OF CONTROLLING LOST CIRCULATION IN WELL DRILLING

BACKGROUND OF THE INVENTION

1. Field of the Invention

This invention relates to the drilling of wells, and more particularly to controlling or stopping the loss of drilling fluid into subterranean formations penetrated by the wells.

In the drilling of a well into the earth by rotary drilling techniques, conventionally a drilling fluid is circulated from the surface of the earth down a drill string having a drill bit on the lower end thereof and through ports provided in the drill bit to the well bottom and thence back to the surface through the annulus formed about the drill string. Commonly, drilling fluids are employed that are either oil or water base. These fluids are treated to provide desired rheological properties which make the fluids particularly useful in the drilling of wells.

A problem often encountered in the drilling of a well is the loss of unacceptably large amounts of drilling fluid into subterranean formations penetrated by the well. This problem is often referred to generally as "lost circulation," and the formations into which the drilling fluid is lost are often referred to as "lost circulation zones" or "thief zones". Various causes may be responsible for the lost circulation encountered in the drilling of a well. For example, a formation penetrated by the well may exhibit unusually high permeability or may contain fractures or crevices therein. In addition, a formation may simply not be sufficiently competent to support the hydrostatic pressure applied by the drilling fluid and may break down under this hydrostatic pressure and allow the drilling fluid to flow thereinto.

2. The Prior Art

Numerous techniques have been developed to control lost circulation. One common technique involves increasing the viscosity of the drilling fluid to increase its resistance to flow into the formation. Another technique involves the addition of bulk material, such as cottonseed hulls, sawdust, or ground walnut shells, to the drilling fluid In addition, asphaltic materials including gilsonite have been added to both water base and oil base fluids to prevent the loss of drilling fluid from the well into surrounding formations. For example, in U.S. Pat. No. 2,773,670 to Miller, there is taught a method of stopping lost circulation by adding asphaltic material to drilling fluids. These materials are added to the drilling fluid in the form of discrete particles and are suspended as such in the fluid where they are carried down the drill pipe and thence via the annulus between the pipe and the well bore to the lost circulation zone. Upon reaching the lost circulation zone, due in part at least to the elevated temperatures and pressures found in the well, the asphalt particles attach themselves to the formation and are fused or bonded to one another and to the formation structure to form an effective seal against the passage of drilling fluid into the formation.

The use of gilsonite in suitable granular form in an aqueous carrier liquid for stopping lost circulation is taught in U.S. Pat. No. 2,812,161 to Mayhew. The granules of gilsonite are simply mixed with a portion of aqueous drilling mud and pumped into the well bore so that the mud will carry the gilsonite granules to the leaking strata and force them into the crevices therein. In accordance with Mayhew, the effective concentration of the granular gilsonite in the aqueous liquid carrier ranges from as little as 10 pounds up to 50 pounds per barrel of the mixture for most common cases of lost circulation, and for severe conditions this concentration may be increased to as much as 100 pounds per barrel.

In U.S. Pat. No. 2,573,690 to Cardwell et al. there is described a method of treating earth formations wherein a filler, which is a solid substance in granular form in two ranges of particle size, one being coarse and corresponding in size to the channel fissures and cracks, the other comparatively fine and corresponding in size to the particles of the formation to be consolidated, is used in conjunction with an earth consolidating resin-forming liquid mixture. Among those substances suggested as filler are walnut shells, pecan shells, coconut shells, and gilsonite.

Other granular materials used in the prevention of loss of fluid into formations include coal and coke. For example, in U.S. Pat. No. 2,650,195 to Cardwell et al., there is disclosed a method of preventing the loss of fluid into formations by providing a cohesive resinous coating upon filterable inert solid particles which are added to the fluid so as to form a filter cake of self-bonding particles when a thief zone is encountered. Various filler materials which are disclosed include coke, coal, cinders, and nut shells. The "coke" which has been used in these prior art techniques has been derived from coal by subjecting coking coal to partial oxidation in coke ovens.

U.S. Pat. No. 3,788,406 to Messenger describes addition of an emulsifying agent and a large amount of ground coal or asphaltic oil-wettable granular particles to control lost circulation.

SUMMARY OF THE INVENTION

This invention is directed to a method of controlling drilling fluid loss by adding particulate petroleum coke to the drilling fluid. The mechanics of the method of this invention do not differ appreciably from previously known methods for controlling drilling fluid loss or "lost circulation", but it has been found that particulate petroleum coke having an appropriate size distribution and in appropriate concentration is a particularly effective lost circulation material.

The present invention provides a method of controlling severe lost circulation problems which may be encountered when drilling a well with either oil base or water base drilling fluids. This method has particular application in controlling lost circulation when drilling with oil base fluids, and is hereinafter described with reference to use with such fluids. It is to be understood, however, that it is also applicable for use in controlling lost circulation when drilling with water base fluids.

DESCRIPTION OF THE PREFERRED EMBODIMENTS

The lost circulation material in accordance with this invention is petroleum coke. Petroleum coke is produced either by the delayed coking process, in which a residual oil is heated and fed to a coking drum where the oil cracks to produce vapors and coke in a semi-batch type process, or by the fluidized bed process, in which small coke particles are produced and recovered in a continuous process. The preferred material is delayed petroleum coke, and more preferably, delayed petroleum "shot" coke. Shot coke is produced generally by operating a delayed coker at slightly more severe than normal conditions. The shot coke is formed as clusters of small spherical coke particles. Delayed coke which does not have the characteristics of shot coke is typically a solid amorphous mass composed largely of carbon. One preferred form of coke for use in accordance with the invention is calcined delayed petroleum coke. Calcination reduces the amount of volatile hydrocarbons in the coke and minimizes the chances of the coke reacting with additives in the drilling fluid. Inclusion of from about 1 up to about 5 percent by weight of finely divided fibrous particles such as oil wettable cellulosic particles often improves performance, particularly when the drilling fluid is an oil base fluid.

The size distribution of the coke particles should be such that the larger particles do not plug the openings in the drill bit, mud motor or other downhole equipment through which the drilling fluid is pumped, with the bulk of the particles being distributed over a size range suitable for blocking openings in the formation with a relatively thin layer of coke particles.

Operable and preferred size distributions for the coke particles are tabulated below:

Size Distribution Table

| Sieve Size Range (Tyler Mesh Sizes) | Particle Diameter (mm) | Allowable Wt % Ranges | Preferred Wt % Ranges |
|---|---|---|---|
| +6 | | 0 | 0 |
| 6 × 10 | 1.7–3.4 | <5 | 0 |
| 10 × 32* | 0.5–1.7 | 20–40 | 30–40* |
| 32 × 60 | 0.25–0.5 | 15–40 | 20–30 |
| 60 × 100 | 0.15–0.25 | 10–30 | 10–20 |
| 100 × 200 | 0.07–0.15 | 5–30 | 5–10 |
| −200 | <0.07 | <5 | <5 |

*Preferred breakdown of 10 × 32 mesh range is as follows:

| Tyler Mesh | Wt % Range |
|---|---|
| 10 × 14 | 10–20 |
| 14 × 20 | 10–20 |
| 20 × 32 | 10–20 |

Delayed petroleum coke has a particle density of about 1.8–2.0 gm/cc. and thus moves with the drilling fluid without a tendency to settle out or float unduly.

Delayed petroleum coke is particularly useful when the drilling fluid is an oil base fluid, because it is an oil-wettable material, and can be added to oil base fluids in very high concentrations without significantly affecting the rheology of the fluid. Loadings of 300 to more than 400 pounds of coke per barrel are possible while still maintaining a pumpable mud. Other characteristics of petroleum coke that make it especially attractive as a lost circulation material are its low porosity and resulting low surface area, its non-swelling property in contact with drilling fluids, its low reactivity or absorptivity with chemicals in the drilling fluid, its low solubility in oil base mud, and its high particle strength and integrity. Calcined delayed petroleum shot coke is especially desirable.

The petroleum coke is added to the drilling fluid in the same manner as conventional lost circulation materials are added.

Experiments were carried out to compare the performance of particulate petroleum coke against several commercial additives for seepage and lost circulation control. The evaluation included formation damage, seal efficiency, abrasion and mud stability testing. The seal efficiency test used filtration discs having permeabilities up to 200 darcies.

In these experiments, particulate petroleum coke did not contribute to formation damage of Berea sandstone cores. No formation damage was evident in a mud system containing mica. Substantial damage was apparent with treated cellulosic fiber in a whole mud after aging.

Petroleum coke with proper size distribution at concentrations of 40 to 60 pounds per barrel in low, medium and high weight water base and oil base muds was effective in sealing a wide range of filter media. Smaller particle size petroleum coke was not as effective. Treated cellulosic fiber as the primary lost circulation material was ineffective in many tests because of the sensitivity of muds containing it to the pore size of the filter media and to the solids concentration of the base mud. As a result filter cakes up to eight centimeters thick were formed in some systems. Mica was effective in sealing the test media except in oil base muds where high concentrations of mica were required to seal the discs. Excessive mica destabilized the emulsion in oil muds.

The abrasiveness test results for petroleum coke in a mud were comparable to those obtained with mica.

The tests showed that petroleum coke would not affect the base properties of an oil mud, and was equal to or better than various concentrations or blends of mica, nut hulls, or treated cellulosic fiber to seal porous substrates.

In the following tests, the term "Fann Dial Reading" refers to the output reading of a particular viscometer, which reading may be converted by a proper constant to give a value for viscosity. In actual practice, it is conventional to simply report the Fann Dial reading directly A higher number represents a higher viscosity. The term "emulsion stability" or "E.S." refers to the voltage required to be imposed on a pair of electrodes to obtain conductivity when the electrodes are immersed in an emulsion. A high number represents high emulsion stability.

When the term "coke" or "petroleum coke" appears in the following tables, it refers to delayed petroleum coke having a size distribution approximately as follows:

| Size - U.S. Sieve Series | Weight Percent Particles |
|---|---|
| +10 | 13 |
| 10 × 20 | 32 |
| 20 × 60 | 31 |
| 60 × 100 | 8 |
| 100 × 200 | 9 |
| −200 | 7 |

When the term "finely divided coke" appears, it refers to calcined delayed petroleum coke having a size distribution approximately as follows:

| Size - U.S. Sieve Series | Weight Percent Particles |
|---|---|
| 10 × 20 | 5 |
| 20 × 30 | 5 |
| 30 × 60 | 28 |
| 60 × 100 | 25 |
| 100 × 200 | 24 |
| −200 | 13 |

EXAMPLE 1

In this example, formation damage is determined by measuring the permeability of a sample which had been vacuum saturated with connate water to a fluid flowing "formation-to-borehole" (initial permeability), treating the sample with an experimental fluid flowing "borehole-to-formation" (mud-off, filtrate, acidize, etc.) and remeasuring the permeability to the fluid "formation-to-borehole" (return permeability). Results are generally reported as percent return permeability calculated as follows:

$$\% \text{ Return Permeability} = \frac{\text{Return Permeability}}{\text{Initial Permeability}} \times 100$$

The following procedure outlines the test method used:
1. The length and diameter of a Berea sandstone core having a nitrogen permeability of approximately 200 md was measured and recorded.
2. The core was saturated with simulation formation water under vacuum for 24 hours.
3. The core was placed in a Hassler cell.
4. A confining pressure of 1000 psi was placed on the sleeve holding the core via the hydraulic pump and maintained while heating the Hassler cell to 200° F.
5. The initial permeability to oil was determined by pushing oil through the core and measuring the pressure and volume of oil with respect to time. The time and volume of oil were measured until a steady state had been achieved.
6. The "borehole" face of the core was either subjected to the mud filtrate by applying a differential pressure to the cell to flow a measured volume of filtrate through the core (30 cm$^3$) or subjected to whole mud for two hours at a differential pressure of 1000 psi.
7. The core was held static for one hour with no differential pressure and the return permeability was then determined by repeating step number five.

The results of the formation damage tests are presented in Tables 1 through 4. The results of using the filtrate of a mud with and without petroleum coke are presented in Table 1. These data indicate that petroleum coke does not contain oil soluble components that are detrimental to the flow of mineral oil through the Berea sandstone formation. The low return permeability of the control system indicates that an excess of emulsifier was present in the mud. This was deliberate in the design of the experiment in order to demonstrate the effect of excess emulsifier on formation damage and determine the interaction of emulsifier and petroleum coke. The higher percent of return permeability of the mud with petroleum coke indicates that the coke can absorb excess emulsifier from the oil phase. This suggests that additional wetting agent such as a polyamide emulsifier should be a supplemental additive. The before and after hot rolling results reveal that no degradation products of the emulsifiers or the coke that impact on the oil permeability of the sandstone are created at 250° F.

Table 2 shows the effects on return permeability of various whole muds This system was designed with high filtration for observation of the effects of petroleum coke. No adverse affects were noted.

Tables 3 and 4 are of an oil base mud formulated for optimum performance that was tested with two other common lost circulation materials, treated cellulosic fiber and mica. No damage was noted with the mica but significant damage was noted with the fiber. The higher than 100% return permeability effect may be due to a further reduction in residual water content of the core from the back flow of mud filtrate. Oil from the mud filtrate releases some trapped residual connate water increasing the permeability of subsequent oil flows. Several potential sources of the damage exist. The fiber may have plugged the pore throats as fibers were visible on the surface of the core at the conclusion of the test. The fibers may have taken up some water and allowed water to enter the core. This is suggested due to the increased rate of separation of the oil from the mud noted at room temperature after hot rolling and the lower emulsion stability values. It should be noted that no free water was detected in the 300° F filtration test. This mud separation phenomenon may account for the mushy filter cake on the core sample. The organic material used to make the fiber oil-dispersible may have come off the fiber during hot rolling and been in solution in the oil phase. This organic material could easily change the wettability of the core.

The rheological and filtration control properties of the muds in Tables 3 and 4 were obtained to demonstrate the effects the various additives would have on the base muds. Only the petroleum coke had a negligible effect on the base mud. The coke was screened out of the mud to prevent particulate interference just prior to running the rheological properties, and the test mud shows little change from the aged base mud.

TABLE 1

FORMATION DAMAGE OF OIL MUD FILTRATE FROM MUDS WITH AND WITHOUT PETROLEUM COKE AND BEFORE AND AFTER AGING

| Mud Composition 85:15 Oil-Water Ratio, 9 Lb/Gal Oil Base Mud | | |
|---|---|---|
| Diesel, cm$^3$ | 284 | 284 |
| Polyamide Emulsifier, cm$^3$ | 5 | 5 |
| 30% CaCl$_2$ solution, cm$^3$ | 49 | 49 |
| Organophilic Clay, g | 3.5 | 3.5 |
| Oxidized Tall Oil, cm$^3$ | 1 | 1 |
| Lime, g | 1 | 1 |
| Barite, g | 76 | 76 |
| Petroleum Coke, g | — | 60 |
| Rheological and Filtration Control Properties at 120° F. | | | |
| Hrs. Hot-rolled @ 250° F. | 0 | 16 | 0 | 16 |
| Fann Dial Reading @ | | | |
| 600 rpm | 31 | 24 | Both are thin |
| 300 rpm | 18 | 14 | and |
| 200 rpm | 12 | 10 | flowable |
| 100 rpm | 8 | 6 | |
| 6 rpm | 3 | 3 | |
| 3 rpm | 3 | 3 | |
| Plastic Viscosity, cP | 13 | 10 | |
| Yield Point, lbf/100 ft$^2$ | 5 | 4 | |
| 10 Sec Gel, lbf/100 ft$^2$ | 4 | 3 | |
| 10 Min Gel, lbf/100 ft$^2$ | 5 | 5 | |
| E.S., volts | 1500 | 1280 | 810 | 1000 |
| Filtration Control - 300° F./500 psi, cm$^3$ in 30 min | 11.2 | 13.6 | 10.4 | 13.6 |
| Cake Thickness (32nd in) | 3 | 3 | 3 | 3 |
| Formation Damage of Filtrates (Berea) | | | |
| Return Permeability @ 200° F. Percent | 50 | 45 | 82 | 90 |

TABLE 2

FORMATION DAMAGE OF OIL MUD WITH AND WITHOUT PETROLEUM COKE AFTER AGING

| Mud Composition 85:15 Oil-Water Ratio, 16 Lb/Gal Oil Base Mud | | |
|---|---|---|
| Diesel, cm$^3$ | 200 | 200 |

TABLE 2-continued
FORMATION DAMAGE OF OIL MUD WITH AND WITHOUT PETROLEUM COKE AFTER AGING

| | | |
|---|---|---|
| Polyamide Emulsifier, cm$^3$ | 3.5 | 3.5 |
| 30% CaCl$_2$ solution, cm$^3$ | 36 | 36 |
| Organophilic Clay, g | 2 | 2 |
| Oxidized Tall Oil, cm$^3$ | 5 | 5 |
| Lime, g | 4 | 4 |
| Barite, g | 445 | 445 |
| Amine Treated Lignite, g | 5 | 5 |
| Petroleum Coke, g | — | 65 |

Rheological and Filtration Control Properties at 120° F.

| | | | | |
|---|---|---|---|---|
| Hrs. Hot-rolled @ 250° F. | 0 | 16 | 0 | 16 |
| Fann Dial Reading @ | | | | |
| 600 rpm | 78 | 76 | Both are thin | |
| 300 rpm | 45 | 43 | and | |
| 200 rpm | 34 | 32 | flowable | |
| 100 rpm | 23 | 21 | | |
| 6 rpm | 10 | 8 | | |
| 3 rpm | 9 | 7 | | |
| Plastic Viscosity, cP | 33 | 33 | | |
| Yield Point, lbf/100 ft$^2$ | 12 | 10 | | |
| 10 Sec Gel, lbf/100 ft$^2$ | 11 | 9 | | |
| 10 Min Gel, lbf/100 ft$^2$ | 14 | 11 | | |
| E.S., volts | 1980 | 1060 | 2000 | 1220 |
| Filtration Control - 300° F./500 psi, cm$^3$ in 30 min | — | 36.2 | — | 22.4 |
| Cake Thickness (32nd in) | — | 7 | — | 8 |

Formation Damage of Whole Mud (Berea)

| | | | | |
|---|---|---|---|---|
| Return Permeability @ 200° F. Percent | — | 56 | — | 71 |

TABLE 3
FORMATION DAMAGE OF OIL BASE MUD WITH AND WITHOUT PETROLEUM COKE AFTER AGING

Mud Composition
85:15 Oil-Water Ratio, 16 Lb/Gal Oil Base Mud

| | | |
|---|---|---|
| Oil, cm$^3$ | 200 | 200 |
| Polyamide Emulsifier, cm$^3$ | 5 | 5 |
| 30% CaCl$_2$ solution, cm$^3$ | 35 | 35 |
| Organophilic Clay, g | 6.5 | 6.5 |
| Oxidized Tall Oil, cm$^3$ | 5 | 5 |
| Lime, g | 4 | 4 |
| Barite, g | 449 | 449 |
| Amine Treated Lignite, g | 15 | 15 |
| Petroleum Coke, g | — | 40 |

Rheological and Filtration Control Properties at 120° F.

| | | | | |
|---|---|---|---|---|
| Hrs. Hot-rolled @ 250° F. | 0 | 16 | 0 | 16* |
| Fann Dial Reading @ | | | | |
| 600 rpm | 132 | 89 | | 96 |
| 300 rpm | 77 | 53 | | 56 |
| 200 rpm | 56 | 41 | | 42 |
| 100 rpm | 34 | 27 | | 27 |
| 6 rpm | 9 | 9 | | 8 |
| 3 rpm | 8 | 8 | | 7 |
| Plastic Viscosity, cP | 55 | 36 | | 40 |
| Yield Point, lbf/100 ft$^2$ | 22 | 17 | | 16 |
| 10 Sec Gel, lbf/100 ft$^2$ | 10 | 10 | | 10 |
| 10 Min Gel, lbf/100 ft$^2$ | 18 | 13 | | 11 |
| E.S., volts | 1560 | 1720 | 1520 | 1460 |
| Filtration Control - 300° F./500 psi, cm$^3$ in 30 min | 3.2 | 2.0 | — | 2.2 |
| Cake Thickness (32nd in) | 3 | 2 | — | 2 |

Formation Damage of Whole Mud (Berea)

| | | | | |
|---|---|---|---|---|
| Return Permeability @ 200° F. Percent | — | 113 | — | 107 |

*Petroleum coke screened out just prior to measuring rheology.

TABLE 4
FORMATION DAMAGE OF OIL BASE MUD WITH CELLULOSIC FIBER AND MICA AFTER AGING

Mud Composition
85:15 Oil-Water Ratio, 16 Lb/Gal Oil Base Mud

| | | |
|---|---|---|
| Oil, cm$^3$ | 200 | 200 |
| Polyamide Emulsifier, cm$^3$ | 5 | 5 |
| 30% CaCl$_2$ solution, cm$^3$ | 35 | 35 |
| Organophilic Clay, g | 6.5 | 6.5 |
| Oxidized Tall Oil, cm$^3$ | 5 | 5 |
| Lime, g | 4 | 4 |
| Barite, g | 449 | 449 |
| Amine Treated Lignite, g | 15 | 15 |
| Cellulosic Fiber, g | 30 | — |
| Mica, g | — | 30 |

Rheological and Filtration Control Properties at 120° F.

| | | | | |
|---|---|---|---|---|
| Hrs. Hot-rolled @ 250° F. | 0 | 16 | 0 | 16 |
| Fann Dial Reading @ | | | | |
| 600 rpm | 263 | 167 | 244 | 195 |
| 300 rpm | 147 | 98 | 143 | 114 |
| 200 rpm | 106 | 71 | 106 | 84 |
| 100 rpm | 62 | 42 | 65 | 52 |
| 6 rpm | 11 | 11 | 20 | 14 |
| 3 rpm | 8 | 8 | 18 | 12 |
| Plastic Viscosity, cP | 116 | 69 | 99 | 81 |
| Yield Point, lbf/100 ft$^2$ | 31 | 29 | 44 | 33 |
| 10 Sec Gel, lbf/100 ft$^2$ | 9 | 10 | 24 | 14 |
| 10 Min Gel, lbf/100 ft$^2$ | 24 | 12 | 35 | 17 |
| E.S., volts | 1500 | 160 | 630 | 720 |
| Filtration Control - 300° F./500 psi, cm$^3$ in 30 min | — | 3.6 | — | 3.2 |
| Cake Thickness (32nd in) | — | 3 | — | 3 |

*Petroleum coke screened out just prior to measuring rheology.

Formation Damage of Whole Mud (Berea)

| | | | | |
|---|---|---|---|---|
| Return Permeability @ 200° F. Percent | — | 43* | — | 112 |

*66% after physical removal of filter cake.

EXAMPLE II

This test was designed to determine the seal efficiency of petroleum coke compared to commercial lost circulation materials. The test equipment involved was a modified high temperature, high pressure filtration unit. The cell was modified to accept ¼ inch thick porous filter media having permeabilities of from 2 to 200 darcys. Samples of base mud were mixed with the additive under test and the ability of the mud to seal the disc was determined. This was done by applying 100 psi to the cell and measuring the spurt loss volume and elapsed time or the time for the cell to blow dry. If the material sealed the disc, the pressure was increased to 500 psi for thirty minutes. The total volume of filtrate and filter cake structure was noted.

Petroleum coke was effective in all water and oil mud systems evaluated at a concentration level of 40 to 60 lb/bbl. No thick filter cakes were observed and little change was noted in the mud properties as indicated by the emulsion stability. The particle size distribution is critical to performance as indicated by the results in Table 17 for finely divided petroleum coke. Petroleum coke (XY) was a sample of material from a warehouse location that was slightly finer in particle size than the other petroleum coke. The limited testing of the finer petroleum coke indicated that it would seal the discs with a porosity of 200 darcys. This may have been a matter of concentration in that a high concentration of large particles was present to seal whereas a lower level of finer coke may not have sealed the disc as effectively.

Mica was effective but had one shortcoming. When using high concentrations to seal the more porous discs, the mica began to destabilize the mud as indicated by high rheological properties and low emulsion stability values. This is shown in Table 7. This limitation can be overcome by increasing the concentration of wetting agent or emulsifier but adds to mud treatment cost. The problem is caused by the high surface area wetting requirement of mica in oil muds. The use of high concentrations of mica in water muds would not pose this problem.

The results for treated cellulosic fiber in Tables 5, 6 and 21 show that it was very sensitive to the concentration of solids and pore size of the test media. The structure of the filter cakes was very distinct when the fiber and mud did not form a seal. A very porous mat structure up to three inches was formed. This same type of mat structure was formed with the fiber/coke combinations tested and reported in Table 8. These filter cakes had coke dispersed uniformly throughout the mat structure.

Physical blends of petroleum coke and fiber were tested and performance was comparable to the use of unadulterated coke. A comparison of a fiber and nut hulls blend was made to fiber and coke in Tables 6, 7 and 11. The blends were equivalent in performance. Studies have shown that the nut hulls alone are not effective and they can contribute to substantial depletion of emulsifier and wetting agents when used in oil muds. These data indicate that petroleum coke seals porous media in laboratory tests as well as a commonly used fiber/nut hull blend but does not adversely affect the properties of the base oil mud like the blend does.

TABLE 5

EVALUATION OF THE SEAL EFFICIENCY OF LCM MATERIAL ON FILTRATION DISCS

| | A | B | C | D | E | F | G | H |
|---|---|---|---|---|---|---|---|---|
| Base Mud: 85:15 Oil-Water Ratio, 9 Lb/Gal Oil Base Mud | | | | | | | | |
| Base Mud, cm$^3$ | 350 | 350 | 350 | 350 | 350 | 350 | 350 | 350 |
| Coke, g | 20 | 40 | 60 | 60 | 60 | 60 | — | — |
| Fiber, g | — | — | — | — | — | — | 40 | 60 |
| Disc Permeability - Darcys | 200 | 200 | 200 | 100 | 40 | 5 | 200 | 200 |
| Filtrate Spurt @ 100 psi | | | | | | | | |
| Volume cm$^3$ | 17 | 6 | 0 | 0.4 | 0 | 0 | 0 | 0 |
| Time, sec | 11 | 10 | 0 | 2 | 0 | 0 | 0 | 0 |
| Blow Dry, sec | — | — | — | — | — | — | — | — |
| Filtrate for 30 min. @ 500 psi | | | | | | | | |
| Volume, cm$^3$ | 46 | 11 | 6 | 8 | 5 | 2 | 40 | 54 |
| Blow Dry, sec | — | — | — | — | — | — | — | — |
| Cake, 32nd in. | 6 | 3 | 5 | 5 | 4 | 5 | 24 | * |
| Fann Dial Readings and Emulsion Stability | | | | | | | | |
| 600 rpm | | | | | | | 59 | 67 |
| 300 rpm | | | | | | | 32 | 39 |
| 200 rpm | | | | | | | 22 | 29 |
| 100 rpm | | | | | | | 12 | 19 |
| 6 rpm | | | | | | | 5 | 6 |
| 3 rpm | | | | | | | 5 | 6 |
| E.S., volts | 1650 | 1610 | 1650 | 1650 | 1650 | 1650 | 720 | 1260 |

*The filter cake disintegrated during disassembly of the cell.

TABLE 6

EVALUATION OF THE SEAL EFFICIENCY OF LCM MATERIAL ON FILTRATION DISCS

| | A | B | C | D | E | F | G | H |
|---|---|---|---|---|---|---|---|---|
| Base Mud: 85:15 Oil-Water Ratio, 9 Lb/Gal Oil Base Mud | | | | | | | | |
| Base Mud, cm$^3$ | 350 | 350 | 350 | 350 | 350 | 350 | 350 | 350 |
| Coke, g | — | — | — | — | 30 | 30 | 30 | 30 |
| Fiber, g | 60 | 60 | 60 | 40 | 10 | 10 | 10 | 10 |
| Disc Permeability - Darcys | 5 | 40 | 100 | 100 | 5 | 40 | 100 | 200 |
| Filtrate Spurt @ 100 psi | | | | | | | | |
| Volume, cm$^3$ | 220 | 200 | 210 | 3 | 0 | 0 | 0 | 1 |
| Time, sec | — | — | — | 7 | 0 | 0 | 0 | 3 |
| Blow Dry, sec | 37 | 35 | 48 | — | — | — | — | — |
| Filtrate for 30 min. @ 500 psi | | | | | | | | |
| Volume, cm$^3$ | — | — | — | 57 | 0 | 2 | 3 | 3 |
| Blow Dry, sec | — | — | — | — | — | — | — | — |
| Cake, 32nd in. | 88 | 88 | 88 | 12 | 1 | 1 | 1 | 2 |
| Fann Dial Readings and Emulsion Stability | | | | | | | | |
| 600 rpm | 67 | 67 | 67 | 59 | | | | |
| 300 rpm | 39 | 39 | 39 | 32 | | | | |
| 200 rpm | 29 | 29 | 29 | 22 | | | | |
| 100 rpm | 19 | 19 | 19 | 12 | | | | |
| 6 rpm | 6 | 6 | 6 | 5 | | | | |
| 3 rpm | 6 | 6 | 6 | 5 | | | | |
| E.S., volts | 1260 | 1260 | 1260 | 720 | 1570 | 1570 | 1570 | 1570 |

TABLE 7

EVALUATION OF THE SEAL EFFICIENCY OF LCM MATERIAL ON FILTRATION DISCS

| | A | B | C | D | E | F | G | H |
|---|---|---|---|---|---|---|---|---|
| Base Mud: 85:15 Oil-Water Ratio, 9 Lb/Gal Oil Base Mud | | | | | | | | |
| Base Mud, cm$^3$ | 350 | 350 | 350 | 350 | 350 | 350 | 350 | 350 |
| Coke, g | — | — | — | — | — | — | — | — |
| Fiber, g | — | — | — | — | — | 10 | 10 | 10 |
| Mica, g | 60 | 30 | 30 | 30 | 40 | — | — | — |
| Nut Hulls, g | — | — | — | — | — | 30 | 30 | 30 |
| Disc Permeability - Darcys | 200 | 200 | 100 | 5 | 200 | 40 | 100 | 200 |
| Filtrate Spurt @ 100 psi | | | | | | | | |
| Volume, cm$^3$ | 0 | 0 | 0 | 1 | 154 | 0 | 1 | 1 |
| Time, sec | 0 | 0 | 0 | 3 | 120 | 0 | 4 | 2 |
| Blow Dry, sec | — | — | — | — | — | — | — | — |
| Filtrate for 30 min. @ 500 psi | | | | | | | | |
| Volume, cm$^3$ | 10 | 40 | 12 | 19 | 162 | 5 | 11 | 7 |
| Blow Dry, sec | — | — | — | — | — | — | — | — |
| Cake, 32nd in. | 7 | * | 5 | 6 | * | 3 | 3 | 3 |
| Fann Dial Readings and Emulsion Stability | | | | | | | | |
| 600 rpm | 160 | 48 | 48 | 48 | 48 | | | |
| 300 rpm | 108 | 28 | 28 | 28 | 29 | | | |
| 200 rpm | 86 | 21 | 21 | 21 | 22 | | | |
| 100 rpm | 62 | 14 | 14 | 14 | 15 | | | |
| 6 rpm | 22 | 6 | 6 | 6 | 7 | | | |
| 3 rpm | 19 | 5 | 5 | 5 | 7 | | | |
| E.S., volts | 200 | 1140 | 1140 | 1140 | 700 | 1100 | 1100 | 1100 |

*The filter cake disintegrated during disassembly of the cell.

TABLE 8

EVALUATION OF THE SEAL EFFICIENCY OF LCM MATERIAL ON FILTRATION DISCS

| | A | B | C | D | E |
|---|---|---|---|---|---|
| Base Mud: 85:15 Oil-Water Ratio, 9 Lb/Gal Oil Base Mud | | | | | |
| Base Mud, cm$^3$ | 350 | 350 | 350 | 350 | 350 |
| Coke, g | 30 | 30 | 30 | — | 30 |
| Fiber I, g | — | — | — | 40 | 30 |

TABLE 8-continued
EVALUATION OF THE SEAL EFFICIENCY OF LCM MATERIAL ON FILTRATION DISCS

| | A | B | C | D | E |
|---|---|---|---|---|---|
| Fiber II, g | 2 | 5 | 2 | — | — |
| Disc Permeability - Darcys | 200 | 200 | 40 | 2 | 200 |
| Filtrate Spurt @ 100 psi | | | | | |
| Volume, cm³ | 3 | 7 | 10 | 1 | 0 |
| Time, sec | 10 | 20 | 7 | 3 | 0 |
| Blow Dry, sec | — | — | — | — | — |
| Filtrate for 30 min. @ 500 psi | | | | | |
| Volume, cm³ | 230 | 230 | 22 | 12 | 3 |
| Blow Dry, sec | 40 | 140 | — | — | — |
| Cake, 32nd in. | 56 | 84 | 6 | 7 | 1 |
| Fann Dial Readings and Emulsion Stability | | | | | |
| 600 rpm | | | | 59 | |
| 300 rpm | | | | 32 | |
| 200 rpm | | | | 22 | |
| 100 rpm | | | | 12 | |
| 6 rpm | | | | 5 | |
| 3 rpm | | | | 5 | |
| E.S., volts | 1320 | 1000 | 1320 | 720 | |

NOTE: A & C were thin and pumpable, B was lumpy and not pumpable.

TABLE 9
EVALUATION OF THE SEAL EFFICIENCY OF LCM MATERIAL ON FILTRATION DISCS

| | A | B | C | D | E | F | G | H |
|---|---|---|---|---|---|---|---|---|
| Base Mud: 85:15 Oil-Water Ratio, 14 Lb/Gal Oil Base Mud | | | | | | | | |
| Base Mud, cm³ | 350 | 350 | 350 | 350 | 350 | 350 | 350 | 350 |
| Coke, g | 20 | 40 | 60 | 40 | 60 | 40 | 40 | — |
| Fiber, g | — | — | — | — | — | — | — | 20 |
| Disc Permeability - Darcys | 100 | 100 | 100 | 200 | 200 | 2 | 40 | 100 |
| Filtrate Spurt @ 100 psi | | | | | | | | |
| Volume, cm³ | 8 | 9 | 0.2 | 0 | 0 | 0 | 0 | 0.3 |
| Time, sec | 5 | 4 | 1 | 0 | 0 | 0 | 0 | 1 |
| Blow Dry, sec | — | — | — | — | — | — | — | — |
| Filtrate for 30 min. @ 500 psi | | | | | | | | |
| Volume, cm³ | 17 | 18 | 7 | 2 | 2 | 5 | 0.6 | 34 |
| Blow Dry, sec | — | — | — | — | — | — | — | — |
| Cake, 32nd in. | 3 | 4 | 3 | 2 | 2 | 2 | 2 | 6 |
| Fann Dial Readings and Emulsion Stability | | | | | | | | |
| 600 rpm | | | | | | | | 82 |
| 300 rpm | | | | | | | | 53 |
| 200 rpm | | | | | | | | 43 |
| 100 rpm | | | | | | | | 31 |
| 6 rpm | | | | | | | | 16 |
| 3 rpm | | | | | | | | 16 |
| E.S., volts | 1470 | 1440 | 1460 | 1440 | 1460 | 1440 | 1440 | 720 |

TABLE 10
EVALUATION OF THE SEAL EFFICIENCY OF LCM MATERIAL ON FILTRATION DISCS

| | A | B | C | D | E | F | G | H |
|---|---|---|---|---|---|---|---|---|
| Base Mud: 85:15 Oil-Water Ratio, 14 Lb/Gal Oil Base Mud | | | | | | | | |
| Base Mud, cm³ | 350 | 350 | 350 | 350 | 350 | 350 | 350 | 350 |
| Coke, g | — | — | — | — | — | — | — | — |
| Fiber, g | 40 | 40 | 40 | 40 | — | — | — | — |
| Mica, g | — | — | — | — | 40 | 60 | 30 | 30 |
| Disc Permeability - Darcys | 100 | 200 | 40 | 2 | 100 | 100 | 100 | 200 |
| Filtrate Spurt @ 100 psi | | | | | | | | |
| Volume, cm³ | 0 | 1 | 0 | 0 | 0 | 0 | 0 | 14 |
| Time, sec | 0 | 2 | 0 | 0 | 0 | 0 | 0 | 23 |
| Blow Dry, sec | — | — | — | — | — | — | — | — |
| Filtrate for 30 min. @ 500 psi | | | | | | | | |
| Volume, cm³ | 22 | 19 | 28 | 0.6 | 25 | 33 | 9 | 25 |
| Blow Dry, sec | — | — | — | — | — | — | — | — |
| Cake, 32nd in. | 13 | 6 | 18 | 4 | 13 | 28 | 6 | 2 |
| Fann Dial Readings and Emulsion Stability | | | | | | | | |
| 600 rpm | 150 | 150 | 150 | 150 | 97 | 148 | 66 | 66 |
| 300 rpm | 104 | 104 | 104 | 104 | 57 | 87 | 41 | 41 |
| 200 rpm | 87 | 87 | 87 | 87 | 43 | 71 | 31 | 31 |
| 100 rpm | 63 | 63 | 63 | 63 | 30 | 49 | 22 | 22 |
| 6 rpm | 32 | 32 | 32 | 32 | 14 | 19 | 11 | 11 |
| 3 rpm | 31 | 31 | 31 | 31 | 13 | 17 | 10 | 10 |
| E.S., volts | 260 | 260 | 260 | 260 | 360 | 160 | 640 | 640 |

TABLE 11
EVALUATION OF THE SEAL EFFICIENCY OF LCM MATERIAL ON FILTRATION DISCS

| | A | B | C | D | E | F | G | H |
|---|---|---|---|---|---|---|---|---|
| Base Mud: 85:15 Oil-Water Ratio, 14 Lb/Gal Oil Base Mud | | | | | | | | |
| Base Mud, cm³ | 350 | 350 | 350 | 350 | 350 | 350 | 350 | 350 |
| Coke, g | 30 | 30 | 30 | 30 | — | — | — | — |
| Fiber, g | 10 | 10 | 10 | 10 | 10 | 10 | 10 | 10 |
| Nut Hulls, g | — | — | — | — | 30 | 30 | 30 | 30 |
| Disc Permeability - Darcys | 2 | 40 | 100 | 200 | 5 | 40 | 100 | 200 |
| Filtrate Spurt @ 100 psi | | | | | | | | |
| Volume, cm³ | 0 | 0 | 0.1 | 0 | 0 | 0 | 0.5 | 0.2 |
| Time, sec | 0 | 0 | 2 | 0 | 0 | 0 | 1 | 12 |
| Blow Dry, sec | — | — | — | — | — | — | — | — |
| Filtrate for 30 min. @ 500 psi | | | | | | | | |
| Volume, cm³ | 1 | 0.5 | 3 | 0.4 | 0.2 | 3 | 12 | 5 |
| Blow Dry, sec | — | — | — | — | — | — | — | — |
| Cake, 32nd in. | 2 | 2 | 3 | 2 | 2 | 2 | 3 | 5 |
| Fann Dial Readings and Emulsion Stability | | | | | | | | |
| 600 rpm | | | | | | | | |
| 300 rpm | | | | | | | | |
| 200 rpm | | | | | | | | |
| 100 rpm | | | | | | | | |

TABLE 11-continued

EVALUATION OF THE SEAL EFFICIENCY OF LCM MATERIAL ON FILTRATION DISCS

|  | A | B | C | D | E | F | G | H |
|---|---|---|---|---|---|---|---|---|
| 6 rpm | | | | | | | | |
| 3 rpm | | | | | | | | |
| E.S., volts | 1680 | 1680 | 1680 | 1680 | 1600 | 1600 | 1600 | 1600 |

TABLE 12

EVALUATION OF THE SEAL EFFICIENCY OF LCM MATERIAL ON FILTRATION DISCS

|  | A | B | C |
|---|---|---|---|
| Base Mud: 85:15 Oil-Water Ratio. 14 Lb/Gal Oil Base Mud | | | |
| Base Mud, cm$^3$ | 350 | 350 | 350 |
| Coke, g | 20 | 20 | — |
| Fiber, g | 20 | 20 | — |
| Mica, g | — | — | 30 |
| Disc Permeability Darcys | 100 | 200 | 40 |
| Filtrate Spurt @ 100 psi | | | |
| Volume, cm$^3$ | 0 | 0.5 | 0 |
| Time, sec | 0 | 10 | 0 |
| Blow Dry, sec | — | — | — |
| Filtrate for 30 min. @ 500 psi | | | |
| Volume, cm$^3$ | 13 | 13 | 9 |
| Blow Dry, sec | — | — | — |
| Cake, 32nd in. | 7 | 7 | 6 |
| Fann Dial Readings and Emulsion Stability | | | |
| 600 rpm | | | 59 |
| 300 rpm | | | 37 |
| 200 rpm | | | 29 |
| 100 rpm | | | 20 |
| 6 rpm | | | 10 |
| 3 rpm | | | 10 |
| E.S., volts | | | 460 |

TABLE 13

EVALUATION OF THE SEAL EFFICIENCY OF LCM MATERIAL ON DISCS

|  | A | B | C | D | E | F | G | H |
|---|---|---|---|---|---|---|---|---|
| Base Mud: 16.4 Lb/Gal Field Oil Base Mud | | | | | | | | |
| Base Mud, cm$^3$ | 350 | 350 | 350 | 350 | 350 | 350 | 350 | 350 |
| Coke, g | 40 | 40 | 40 | 40 | 40 | — | — | — |
| Fiber, g | — | — | — | — | — | 40 | 40 | 40 |
| Disc Permeability Darcys | 5 | 40 | 100 | 200 | 5 | 40 | 100 | 200 |
| | 100 | | | | | | | |
| Filtrate Spurt @ 100 psi | | | | | | | | |
| Volume, cm$^3$ | 0 | 0 | 0 | 0.5 | 0 | 0 | 0 | 50 |
| Time, sec | 0 | 0 | 0 | 10 | 0 | 0 | 0 | 60 |
| Blow Dry, sec | — | — | — | — | — | — | — | — |
| Filtrate for 30 min. @ 500 psi | | | | | | | | |
| Volume, cm$^3$ | 0.1 | 0 | 0 | 3 | 0 | 0 | 0 | 90 |
| Blow Dry, sec | — | — | — | — | — | — | — | — |
| Cake, 32nd in. | 2 | 1 | 1 | 1 | 1 | 3 | 2 | 1 |
| Fann Dial Readings and Emulsion Stability | | | | | | | | |
| 600 rpm | | | | | | 226 | 226 | 226 |
| 300 rpm | | | | | | 126 | 126 | 126 |
| 200 rpm | | | | | | 94 | 94 | 94 |
| 100 rpm | | | | | | 59 | 59 | 59 |
| 6 rpm | | | | | | 18 | 18 | 18 |
| 3 rpm | | | | | | 16 | 16 | 16 |
| E.S., volts | 1300 | 1300 | 1300 | 1300 | 1300 | 240 | 240 | 260 |

TABLE 14

EVALUATION OF THE SEAL EFFICIENCY 26 LCM MATERIAL ON FILTRATION DISCS

|  | A | B | C | D | E | F | G |
|---|---|---|---|---|---|---|---|
| Base Mud: 16.4 Lb/Gal Field Oil Base Mud | | | | | | | |
| Base Mud, cm$^3$ | 350 | 350 | 350 | 350 | 350 | 350 | 350 |
| Coke, g | 40 | — | — | — | — | — | — |
| Fiber, g | — | 40 | — | — | — | — | — |
| Mica, g | — | — | 30 | 30 | 30 | — | — |
| Disc Permeability Darcys | 40 | 40 | 40 | 100 | 200 | 40 | 100 |
| Filtrate Spurt @ 100 psi | | | | | | | |
| Volume, cm$^3$ | 0 | 0 | 0 | 0 | 300 | 0 | 0 |
| Time, sec | 0 | 0 | 0 | 10 | — | 0 | 0 |
| Blow Dry, sec | — | — | — | — | 90 | — | — |
| Filtrate for 30 min. @ 500 psi | | | | | | | |
| Volume, cm$^3$ | Trace | 0 | 0 | 0 | — | 0 | 0 |
| Blow Dry, sec | — | — | — | — | — | — | — |
| Cake, 32nd in. | 1 | 1 | 3 | 2 | 1 | 3 | 2 |
| Fann Dial Readings and Emulsion Stability | | | | | | | |
| 600 rpm | | | 147 | 147 | 147 | 84 | 84 |
| 300 rpm | | | 84 | 84 | 84 | 49 | 49 |
| 200 rpm | | | 63 | 63 | 63 | 37 | 37 |
| 100 rpm | | | 40 | 40 | 40 | 24 | 24 |
| 6 rpm | | | 13 | 13 | 13 | 9 | 9 |
| 3 rpm | | | 11 | 11 | 11 | 8 | 8 |
| E.S., volts | 1300 | 240 | 740 | 740 | 740 | 1320 | 1320 |

TABLE 15

EVALUATION OF THE SEAL EFFICIENCY 35 LCM MATERIAL ON FILTRATION DISCS

|  | A | B | C | D | E | F | G | H |
|---|---|---|---|---|---|---|---|---|
| Base Mud: 16.4 Lb/Gal Field Oil Base Mud | | | | | | | | |
| Base Mud, cm$^3$ | 350 | 350 | 350 | 350 | 350 | 350 | 350 | 350 |
| Coke, g | 30 | 30 | 30 | 30 | 30 | — | — | — |
| Fiber, g | 10 | 10 | 10 | 10 | 10 | 10 | 10 | 10 |
| Nut Hulls, g | — | — | — | — | — | 30 | 30 | 30 |
| Disc Pearmeability Darcys | 40 | 100 | 200 | 200 | 200 | 40 | 100 | 200 |
| Filtrate Spurt @ 100 psi | | | | | | | | |
| Volume, cm$^3$ | 0 | 0 | 0.3 | 2 | 2 | 0 | 0 | 1 |
| Time, sec | 0 | 0 | 5 | 20 | 10 | 0 | 0 | 15 |
| Blow Dry, sec | — | — | — | — | — | — | — | — |
| Filtrate for 30 min. @ 500 psi | | | | | | | | |
| Volume, cm$^3$ | 0 | 0 | 1 | 4 | 3.5 | 0 | 2 | 4 |
| Blow Dry, sec | — | — | — | — | — | — | — | — |
| Cake, 32nd in. | 1 | 1 | 1 | 1 | 1 | 2 | 2 | 1 |
| Fann Dial Readings and Emulsion Stability | | | | | | | | |
| 600 rpm | | | | | | | | |
| 300 rpm | | | | | | | | |
| 200 rpm | | | | | | | | |
| 100 rpm | | | | | | | | |
| 6 rpm | | | | | | | | |
| 3 rpm | | | | | | | | |
| E.S., volts | 1350 | 1350 | 1350 | 1350 | 1350 | 1280 | 1280 | 1280 |

TABLE 16
EVALUATION OF THE SEAL EFFICIENCY OF LCM MATERIAL ON FILTRATION DISCS

| | A | B | C | D |
|---|---|---|---|---|
| BASE MUD: | | | | |
| | 16.4 Lb/Gal Field Oil Base Mud | | 9 Lb/Gal Oil Base Mud | |
| Base Mud, cm³ | 350 | 350 | 350 | 350 |
| Coke, g | 38.8 | 38.8 | 58.2 | 58.2 |
| Fiber, g | 1.2 | 1.2 | 1.8 | 1.8 |
| Disc Permeability Darcys | 100 | 200 | 100 | 200 |
| Filtrate Spurt @ 100 psi | | | | |
| Volume, cm³ | 0 | 0.5 | 1 | 0 |
| Time, sec | 0 | 10 | 5 | 0 |
| Blow Dry, sec | — | — | — | — |
| Filtrate for 30 min. @ 500 psi | | | | |
| Volume, cm³ | 0 | 2 | 6 | 2 |
| Blow Dry, sec | — | — | — | — |
| Cake, 32nd in. | 1 | 1 | 2 | 2 |
| Fann Dial Readings and Emulsion Stability | | | | |
| 600 rpm | | | | |
| 300 rpm | | | | |
| 200 rpm | | | | |
| 100 rpm | | | | |
| 6 rpm | | | | |
| 3 rpm | | | | |
| E.S., volts | 1520 | 1520 | 880 | 880 |

TABLE 17
EVALUATION OF THE SEAL EFFICIENCY OF LCM MATERIAL ON FILTRATION DISCS

| | A | B | C | D |
|---|---|---|---|---|
| Base Mud: 9 lb/gal Oil Base Mud | | | | |
| Base Mud, cm³ | 350 | 350 | 350 | 350 |
| Finely Divided Coke, g | 60 | 60 | — | — |
| Coke, g | — | — | 60 | 60 |
| Disc Permeability Darcys | 40 | 200 | 40 | 200 |
| Filtrate Spurt @ 100 psi | | | | |
| Volume, cm³ | 0 | 3.5 | 0 | 0 |
| Time, sec | 0 | 20 | 0 | 0 |
| Blow Dry, sec | — | — | — | — |
| Filtrate for 30 min. @ 500 psi | | | | |
| Volume, cm³ | 1 | 53 | 2 | 1 |
| Blow Dry, sec | — | — | — | — |
| Cake, 32nd in. | 2 | 3 | 3 | 2 |

TABLE 18
EVALUATION OF THE SEAL EFFICIENCY OF LCM MATERIAL ON FILTRATION DISCS

| | A | B | C | D | E | F | G |
|---|---|---|---|---|---|---|---|
| Base Mud: 12 Lb/Gal Sea Water Polymer Mud | | | | | | | |
| Base Mud, cm³ | 350 | 350 | 350 | 350 | 350 | 350 | 350 |
| Coke, g | 40 | 40 | 40 | 40 | — | — | — |
| Fiber, g | — | — | — | — | 20 | 40 | 40 |
| Disc Permeability Darcys | 5 | 40 | 100 | 200 | 100 | 100 | 200 |
| Filtrate Spurt @ 100 psi | | | | | | | |
| Volume, cm³ | 0 | 0 | 0.3 | 0.5 | 2 | 0 | 6.5 |
| Time, sec | 0 | 0 | 2 | 3 | 10 | 0 | 5 |
| Blow Dry, sec | — | — | — | — | — | — | — |
| Filtrate for 30 min. @ 500 psi | | | | | | | |
| Volume, cm³ | 0.5 | 4 | 5 | 3 | 6 | 5 | 40 |
| Blow Dry, sec | — | — | — | — | — | — | — |
| Cake, 32nd in. | 3 | 3 | 2 | 2 | 2 | 4 | 7 |
| Fann Dial Readings and Emulsion Stability | | | | | | | |
| 600 rpm | | | | | 116 | 171 | 171 |
| 300 rpm | | | | | 77 | 114 | 114 |
| 200 rpm | | | | | 60 | 91 | 91 |
| 100 rpm | | | | | 40 | 61 | 61 |
| 6 rpm | | | | | 9 | 16 | 16 |
| 3 rpm | | | | | 7 | 12 | 12 |

TABLE 19
EVALUATION OF THE SEAL EFFICIENCY OF LCM MATERIAL ON FILTRATION DISCS

| | A | B | C | D |
|---|---|---|---|---|
| Base Mud: 12 Lb/Gal Sea Water Polymer Mud | | | | |
| Base Mud, cm³ | 350 | 350 | 350 | 350 |
| Mica, g | 40 | 40 | 40 | — |
| Disc Permeability Darcys | 40 | 10 | 200 | 100 |
| Filtrate Spurt @ 100 psi | | | | |
| Volume, cm³ | 0 | 0 | 0 | 10 |
| Time, sec | 0 | 0 | 0 | 5 |
| Blow Dry, sec | — | — | — | — |
| Filtrate for 30 min. @ 500 psi | | | | |
| Volume, cm³ | 9 | 8 | 11 | 48 |
| Blow Dry, sec | — | — | — | — |
| Cake, 32nd in. | 7 | 6 | 7 | 1 |
| Fann Dial Readings and Emulsion Stability | | | | |
| 600 rpm | 136 | 136 | 136 | 122 |
| 300 rpm | 91 | 91 | 91 | 85 |
| 200 rpm | 72 | 72 | 72 | 69 |
| 100 rpm | 49 | 49 | 49 | 48 |
| 6 rpm | 12 | 12 | 12 | 14 |
| 3 rpm | 9 | 9 | 9 | 11 |

TABLE 20
EVALUATION OF THE SEAL EFFICIENCY OF LCM MATERIAL ON FILTRATION DISCS

| | A | B | C | D | E | F | G | H |
|---|---|---|---|---|---|---|---|---|
| Base Mud: 16.4 Lb/Gal Field Oil Base Mud | | | | | | | | |
| Base Mud, cm³ | 350 | 350 | 350 | 350 | 350 | 350 | 350 | 350 |
| Coke, g | 40 | 60 | 60 | 60 | — | — | — | — |
| Mica, g | — | — | — | — | 60 | 60 | 60 | 60 |
| Disc Permeability Darcys | 100 | 40 | 100 | 200 | 5 | 40 | 100 | 200 |
| Filtrate Spurt @ 100 psi | | | | | | | | |
| Volume, cm³ | 8 | 3 | 0 | 4 | 0 | 2 | 2 | 11 |
| Time, sec | 5 | 5 | 0 | 5 | 0 | 30 | 5 | 20 |
| Blow Dry, sec | — | — | — | — | — | — | — | — |
| Filtrate for 30 min. @ 500 psi | | | | | | | | |
| Volume, cm³ | 17 | 9 | 2 | 12 | 11 | 23 | 20 | 18 |
| Blow Dry, sec | — | — | — | — | — | — | — | — |
| Cake, 32nd in. | 3 | 6 | 5 | 9 | 6 | 8 | 8 | 2 |
| Fann Dial Readings and Emulsion Stability | | | | | | | | |
| 600 rpm | | | | | 75 | 75 | 75 | 75 |
| 300 rpm | | | | | 50 | 50 | 50 | 50 |
| 200 rpm | | | | | 39 | 39 | 39 | 39 |
| 100 rpm | | | | | 27 | 27 | 27 | 27 |
| 6 rpm | | | | | 7 | 7 | 7 | 7 |
| 3 rpm | | | | | 5 | 5 | 5 | 5 |

TABLE 21
EVALUATION OF THE SEAL EFFICIENCY OF LCM MATERIAL ON FILTRATION DISCS

| | A | B | C | D | E |
|---|---|---|---|---|---|
| Base Mud: 9 Lb/Gal Sea Water Polymer Mud | | | | | |
| Base Mud, cm³ | 350 | 350 | 350 | 350 | 350 |
| Fiber, g | 20 | 40 | 60 | 20 | 20 |
| Disc Permeability Darcys | 100 | 100 | 100 | 40 | 200 |
| Filtrate Spurt @ 100 psi | | | | | |

TABLE 21-continued
EVALUATION OF THE SEAL EFFICIENCY OF LCM MATERIAL ON FILTRATION DISCS

|   | A | B | C | D | E |
|---|---|---|---|---|---|
| Volume, cm³ | 55 | 90 | 185 | 72 | 75 |
| Time, sec | 30 | 5 | 60 | 60 | 60 |
| Blow Dry, sec | — | — | — | — | — |
| Filtrate for 30 min. @ 500 psi | | | | | |
| Volume, cm³ | 82 | 185 | 250 | 95 | 270 |
| Blow Dry, sec | — | — | 180 | — | 28 |
| Cake, 32nd in. | 7 | 40 | 76 | 10 | 32 |
| Fann Dial Readings and Emulsion Stability | | | | | |
| 600 rpm | 56 | 85 | 100 | 56 | 56 |
| 300 rpm | 37 | 59 | 69 | 37 | 37 |
| 200 rpm | 30 | 47 | 56 | 30 | 30 |
| 100 rpm | 20 | 32 | 39 | 20 | 20 |
| 6 rpm | 4 | 8 | 10 | 4 | 4 |
| 3 rpm | 3 | 6 | 7 | 3 | 3 |

EXAMPLE III

This example was designed to measure the relative abrasiveness of petroleum coke and other additives. The relative abrasiveness was determined with a laboratory procedure adapted from API bulletin RP 13I for weighting material. The test procedure uses a standard test blade attached to a high speed mixer that shears a measured volume of base mud containing the additives under test. The weight loss of the blade is used to calculate the abrasiveness of the additive under test. The procedure outlined below varied from the test for weighting material in that only one barrel equivalent of base mud was used and the base mud was weighted to 12 lb/gal as opposed to 14 lb/gal. The lighter weight was selected to limit the abrasion effects of the weighting material on the test blade.

Table 22 contains the results of the abrasion testing. These data show that petroleum coke and mica had nearly identical abrasion rates. The results for a harder and finer particle size sample of petroleum coke were of interest. They indicate that for this type of material under the defined test conditions, a larger particle is more abrasive than a harder particle.

The compositions of the muds used were as follows:

Sea Water Polymer Mud

| Weighting Material: | Barite | Hematite |
|---|---|---|
| Sea Water, bbl | 0.87 | 0.89 |
| Prehydrated gel, lb | 5.0 | 5.0 |
| NaOH, lb | 1.0 | 1.0 |
| XCD biopolymer, lb | 1.0 | 1.0 |
| ASP-700 (PHPA), lb | 1.5 | 1.5 |
| Drispac Superlo, lb | 2.0 | 2.0 |
| Pierre shale (40 mesh), lb | 40.0 | 40.0 |
| Barite, lb | 178.0 | — |
| Hematite, lb | — | 178.0 |

Oil Mud

| Weighting Material: | Barite | Hematite |
|---|---|---|
| Diesel, bbl | 0.68 | 0.70 |
| Oxidized Tall Oil, lb | 5.0 | 5.0 |
| Lime, lb | 4.0 | 4.0 |
| Polyamide Emulsifier, lb | 3.0 | 3.0 |
| 30% CaCl₂ soln., bbl | 0.17 | 0.18 |
| Organophilic Clay, lb | 3.0 | 3.0 |
| Barite, lb | 228.0 | — |
| Hematite, lb | — | 218.0 |

A model 936 Hamilton Beach mixer equipped with a Waring Blender blade, Part No. 003540, was used in the test method described below:

1. Exactly 350 cm³ of base mud was measured out for each test. The base mud was tested either neat or with 60 g of the additive under test. The materials evaluated in the base mud were mixed into the mud with a spatula to eliminate degradation prior to testing.
2. A new test blade was weighed to the nearest 0.1 mg and installed on the mixer.
3. The mixing container containing the composition under test was installed on the mixer with the power supply disconnected.
4. The mixer was adjusted to a rotational speed of 10,000 rpm via a rheostat with the aid of the tachometer.
5. After twenty minutes the testing was terminated and the mixing blade weighed to the nearest 0.1 mg.

The test results are reported as milligrams lost per twenty minutes, and are given in Table 22. No rheological properties are listed for the muds containing petroleum coke due to the particulate interference of it between the rheometer bob and sleeve. However, all muds containing coke were very thin and flowable. The funnel viscosity is not subject to this particle interference and was determined on a field mud containing the additives. The results are given below as a rough comparison.

| Composition | Funnel Viscosity @ R.T., Seconds |
|---|---|
| 16.4 lb/gal Field Oil Mud | 58 |
| Mud + Petroleum Coke @ 40 lb/bbl equiv. | 66 |
| Mud + Mica @ 30 lb/bbl equiv. | 113 |
| Mud + Fiber @ 40 lb/bbl equiv. | 167 |

TABLE 22
ABRASION TESTING OF VARIOUS COMBINATIONS OF LCM ADDITIVES AND MUD TYPES

| MUD TYPE | ADDITIVE & CONCENTRATION lb/bbl equiv. | WEIGHT LOSS mg/20 min. |
|---|---|---|
| 12 lb/gal Sea Water Polymer Mud with Barite | — | 7 |
| 12 lb/gal Sea Water Polymer Mud with Barite | Petroleum Coke | 87 |
| 12 lb/gal Sea Water Polymer Mud with Barite | Finely Divided Petroleum Coke | 35 |
| 12 lb/gal Sea Water Polymer Mud with Barite | Mica 60 | 78 |
| 12 lb/gal Sea Water Polymer Mud with Hematite | — | 34 |
| 12 lb/gal, 80:20 OWR, Oil Mud with Barite | — | 13 |
| 12 lb/gal, 80:20 OWR, Oil Mud with Barite | Petroleum Coke | 47 |
| 12 lb/gal, 80:20 OWR, Oil Mud with Barite | Finely Divided Petoleum Coke | 18 |
| 12 lb/gal, 80:20 OWR, Oil Mud with Barite | Mica 60 | 40 |
| 12 lb/gal, 80:20 OWR, Oil Mud with Hematite | — | 88 |

We claim:

1. In a process of drilling a well wherein a drilling fluid is pumped from the surface of the ground through a drill pipe string in said well and back to the surface of the ground via the annulus between said drill pipe string and the borehole wall of said well and wherein lost circulation of said drilling fluid is encountered, the improvement in correcting said lost circulation of said drilling fluid comprising:
   (a) adding to said drilling fluid a lost circulation material consisting essentially of petroleum coke, said petroleum coke having from 35 to 80 percent by weight particles between 10 and 60 mesh and being added in an amount effective to correct said lost circulation; and
   (b) pumping said drilling fluid containing said lost circulation material into said well to contact said lost circulation zone whereby said zone is sealed from further lost circulation by said lost circulation material.

2. The process of claim 1 wherein said drilling fluid is a water base drilling fluid.

3. The process of claim 1 wherein said drilling fluid is an oil base drilling fluid.

4. The process of claim 1 wherein said petroleum coke is fluidized bed petroleum coke.

5. The process of claim 1 wherein said petroleum coke is delayed petroleum coke.

6. The process of claim 5 wherein said delayed petroleum coke is ground shot coke.

7. The process of claim 6 wherein said shot coke contains from 50 to 70 percent by weight particles between 10 and 60 mesh.

8. The process of claim 7 wherein said coke is calcined shot coke.

* * * * *